(12) United States Patent
Sun

(10) Patent No.: US 11,602,831 B1
(45) Date of Patent: Mar. 14, 2023

(54) AIR IMPACT TOOL HAVING IMPROVED VIBRATION-DAMPING STRUCTURE

(71) Applicant: STORM PNEUMATIC TOOL CO., LTD., Taichung (TW)

(72) Inventor: Yung Yung Sun, Taichung (TW)

(73) Assignee: STORM PNEUMATIC TOOL CO., LTD., Taichung (TW)

( * ) Notice: Subject to any disclaimer, the term of this patent is extended or adjusted under 35 U.S.C. 154(b) by 0 days.

(21) Appl. No.: 17/942,527

(22) Filed: Sep. 12, 2022

(30) Foreign Application Priority Data

Jan. 21, 2022 (TW) ................................. 111102645

(51) Int. Cl.
  *B25D 9/04* (2006.01)
  *B25D 17/24* (2006.01)
  *B25D 9/08* (2006.01)

(52) U.S. Cl.
  CPC .............. *B25D 17/24* (2013.01); *B25D 9/04* (2013.01); *B25D 9/08* (2013.01); *B25D 2250/181* (2013.01)

(58) Field of Classification Search
  CPC ... B25D 9/04; B25D 9/08; B25D 9/18; B25D 17/24; B25D 17/245; B25D 2250/181
  See application file for complete search history.

(56) References Cited

U.S. PATENT DOCUMENTS

| | | | | |
|---|---|---|---|---|
| 1,771,238 A | * | 7/1930 | Walsh | B25D 9/18 |
| | | | | 91/335 |
| 2,722,918 A | * | 11/1955 | Kimball | B25D 9/08 |
| | | | | 173/121 |
| 3,245,483 A | * | 4/1966 | Etzkorn | B25D 9/14 |
| | | | | 173/137 |
| 3,635,605 A | * | 1/1972 | Hall | B23B 45/04 |
| | | | | 123/387 |
| 3,727,700 A | * | 4/1973 | Amtsberg | B25D 17/245 |
| | | | | 173/212 |
| 3,838,741 A | * | 10/1974 | Pepe | E02D 7/10 |
| | | | | 173/136 |
| 4,074,777 A | * | 2/1978 | Andersson | B25D 9/14 |
| | | | | 91/5 |

(Continued)

FOREIGN PATENT DOCUMENTS

TW   I235700 B   7/2005
TW   I637825 B   10/2018

(Continued)

*Primary Examiner* — Thomas M Wittenschlaeger
*Assistant Examiner* — David G Shutty

(57) ABSTRACT

An air impact tool includes an inner tubular member that is connected to the barrel. The inner tubular member has an annular wall and a cavity. The annular wall has exhaust hole. An air flow channel communicating with the air flow control valve and the cavity is defined inside the annular wall. The air flow channel is formed with a first air inlet. A hammer is in the cavity. The hammer is in close contact with the annular wall. A cylindrical gap is defined between a middle section of the hammer and the annular wall. The hammer has an exhaust passageway communicating with the cavity and the cylindrical gap. When the compressed air is injected into the cavity from the first air inlet, the hammer is pushed back, and the compressed air is exhausted via the exhaust passageway, the cylindrical gap and the exhaust hole in sequence.

6 Claims, 6 Drawing Sheets

(56) References Cited

U.S. PATENT DOCUMENTS

| | | | | |
|---|---|---|---|---|
| 4,388,972 | A * | 6/1983 | Gidlund | B25D 17/245 92/85 B |
| 4,681,172 | A * | 7/1987 | Mikiya | B25D 9/14 92/85 B |
| 4,723,610 | A * | 2/1988 | Dummermuth | B25D 17/06 29/81.14 |
| 4,776,408 | A * | 10/1988 | Elkin | B25D 17/24 92/85 B |
| 4,936,393 | A * | 6/1990 | Lister | B25D 9/14 173/13 |
| 5,184,382 | A * | 2/1993 | Ward | B25D 17/02 29/81.17 |
| 5,251,367 | A * | 10/1993 | Ward | B25D 17/02 173/168 |
| 5,485,887 | A * | 1/1996 | Mandanis | B25D 17/06 173/91 |
| 5,884,713 | A * | 3/1999 | Shinohara | B25D 9/145 91/290 |
| 5,971,083 | A * | 10/1999 | Wiklund | B25D 9/14 173/121 |
| 6,161,628 | A * | 12/2000 | Liu | B25D 9/20 173/206 |
| 6,192,997 | B1 * | 2/2001 | Tsai | B25D 9/18 173/210 |
| 6,668,942 | B1 * | 12/2003 | Lin | B25D 17/24 173/162.1 |
| 6,691,798 | B1 * | 2/2004 | Lindsay | B25D 9/26 173/206 |
| 7,383,894 | B2 * | 6/2008 | Chen | B25D 17/08 173/162.1 |
| 8,240,394 | B2 * | 8/2012 | Kobayashi | B25D 9/18 173/162.1 |
| 9,079,286 | B1 * | 7/2015 | DeCamillis | B25D 17/08 |
| 9,108,311 | B2 * | 8/2015 | Keskiniva | B25D 17/245 |
| 9,844,867 | B2 * | 12/2017 | Hsieh | B25D 17/24 |
| 10,335,938 | B2 * | 7/2019 | Hsieh | B25D 17/245 |
| 10,792,798 | B2 * | 10/2020 | Liaw | B25D 9/16 |
| 2007/0215370 | A1 * | 9/2007 | Chen | B25F 5/006 173/162.1 |
| 2007/0227753 | A1 * | 10/2007 | Chen | B25D 9/04 173/128 |
| 2007/0295523 | A1 * | 12/2007 | Chen | B25D 9/08 173/128 |
| 2017/0001294 | A1 | 1/2017 | Koizmui et al. | |
| 2018/0200874 | A1 | 7/2018 | Lin | |
| 2019/0344418 | A1 * | 11/2019 | Liao | B25D 17/24 |
| 2021/0245350 | A1 * | 8/2021 | Sun | B25D 9/08 |

FOREIGN PATENT DOCUMENTS

| | | |
|---|---|---|
| TW | I729809 B | 6/2021 |
| TW | I730897 B | 6/2021 |
| TW | M626640 U | 5/2022 |

* cited by examiner

AIR IMPACT TOOL HAVING IMPROVED VIBRATION-DAMPING STRUCTURE

FIELD OF THE INVENTION

The present invention relates to a pneumatic tool, and more particularly to an air impact tool having an improved vibration-damping structure.

BACKGROUND OF THE INVENTION

When in use, an air impact tool will vibrate due to the reciprocating displacement of the hammer of the air impact tool. After a period of time, the user may feel uncomfortable, leading to undesirable effects on the user's palm. In particular, the stronger the hitting force of the air impact tool, the greater the vibration caused by the hammer, and the greater the damage to the user. Therefore, it is necessary to improve the air impact tool.

Taiwan Patent Publication No. 1235700 and 1729809 disclose a pneumatic tool. An air chamber is disposed at the rear of the barrel of the pneumatic tool for the hammer to compress the air in the air chamber when the hammer is moved back, thereby providing a buffer effect and reducing the vibration caused by the hammer to the barrel. As shown in FIG. 4 of Taiwan Patent Publication No. 1729809, a spring or rubber block is disposed at the rear of the barrel of the pneumatic tool. The spring or rubber block is configured for the hammer to push the spring or rubber block when the hammer is moved back, thereby providing a buffer effect by means of the deformation of the spring or rubber block and reducing the vibration caused by the hammer to the barrel.

The above-mentioned two conventional structures add other components to the existing structure of the pneumatic tool (for example, changing the space configuration to form an air chamber, adding a spring or rubber block, etc.). When the pneumatic tool generates mighty vibrations, the vibrations will be reduced by buffering. In addition to the disadvantage of increased cost, the vibration-damping effect is not ideal. The user may suffer discomfort in the hand during operation.

In the structure disclosed in FIG. 5 of the above-mentioned Taiwan Patent Publication No. 1235700, the pneumatic tool has an air tube communicating with the front end of the barrel, so that the hammer that has been moved to the front of the barrel is then moved back via the compressed air. A vent hole is disposed at about the middle of the barrel for exhausting the compressed air. However, in the process that the hammer is moved forward to hit the tool head and then moved back, the compressed air in the barrel is exhausted only after the hammer passes through the vent hole in the middle position. Before the compressed air is exhausted, the hammer has been driven back to the rear end of the barrel via the compressed air, so the hammer hits the rear end of the barrel with a large force. This causes the vibrations of the pneumatic tool.

SUMMARY OF THE INVENTION

The primary object of the present invention is to provide an air impact tool having an improved vibration-damping structure. A tubular member of the air impact tool has at least one exhaust hole to directly reduce the impact force of the hammer by exhausting the compressed air when the hammer is moved back. Accordingly, the present invention provides a better vibration-damping effect, without adding additional components.

In order to achieve the foregoing object, the present invention provides an air impact tool having an improved vibration-damping structure. The air impact tool comprises a grip, a barrel, an inner tubular member, and a hammer.

The grip has an accommodating chamber therein and an air passageway communicating with the accommodating chamber. An air flow switch is disposed in the air passageway.

The barrel is accommodated in the accommodating chamber. An air flow control valve is disposed in the barrel. A side wall of the barrel has a through hole communicating with the air passageway for introducing compressed air into the air flow control valve.

The inner tubular member includes an annular wall secured to the barrel and a cavity surrounded by the annular wall. A tool head is disposed at a front end of the annular wall. The annular wall has at least one exhaust hole for the cavity to communicate with an outside of the impact tool. An air flow channel communicating with the air flow control valve and the cavity is defined inside the annular wall. The air flow channel is formed with a first air inlet at a front end of the cavity. A second air inlet is formed at a rear end of the cavity. The second air inlet communicates with the air flow control valve. The air flow control valve selectively injects the compressed air into the cavity from the first air inlet or the second air inlet.

The hammer is disposed in the cavity. The hammer includes a head portion and a body portion. The head portion is closer to the first air inlet than the body portion. The body portion includes a front section, a middle section, and a rear section. The front section and the rear section are in close contact with the annular wall. A cylindrical gap is defined between the middle section and the annular wall. The head portion has an exhaust passageway communicating with the cavity and the cylindrical gap.

When the air flow control valve injects the compressed air into the cavity from the second air inlet, the hammer is pushed by the compressed air to move toward the tool head.

When the air flow control valve injects the compressed air into the cavity from the first air inlet, the hammer is pushed away from the tool head by the compressed air. In this process, when the cylindrical gap communicates with the exhaust hole, the compressed air in the cavity is exhausted via the exhaust passageway, the cylindrical gap and the exhaust hole in sequence, so as to reduce a force with which the hammer is pushed.

DETAILED DESCRIPTION OF THE PREFERRED EMBODIMENTS

Figure 1:
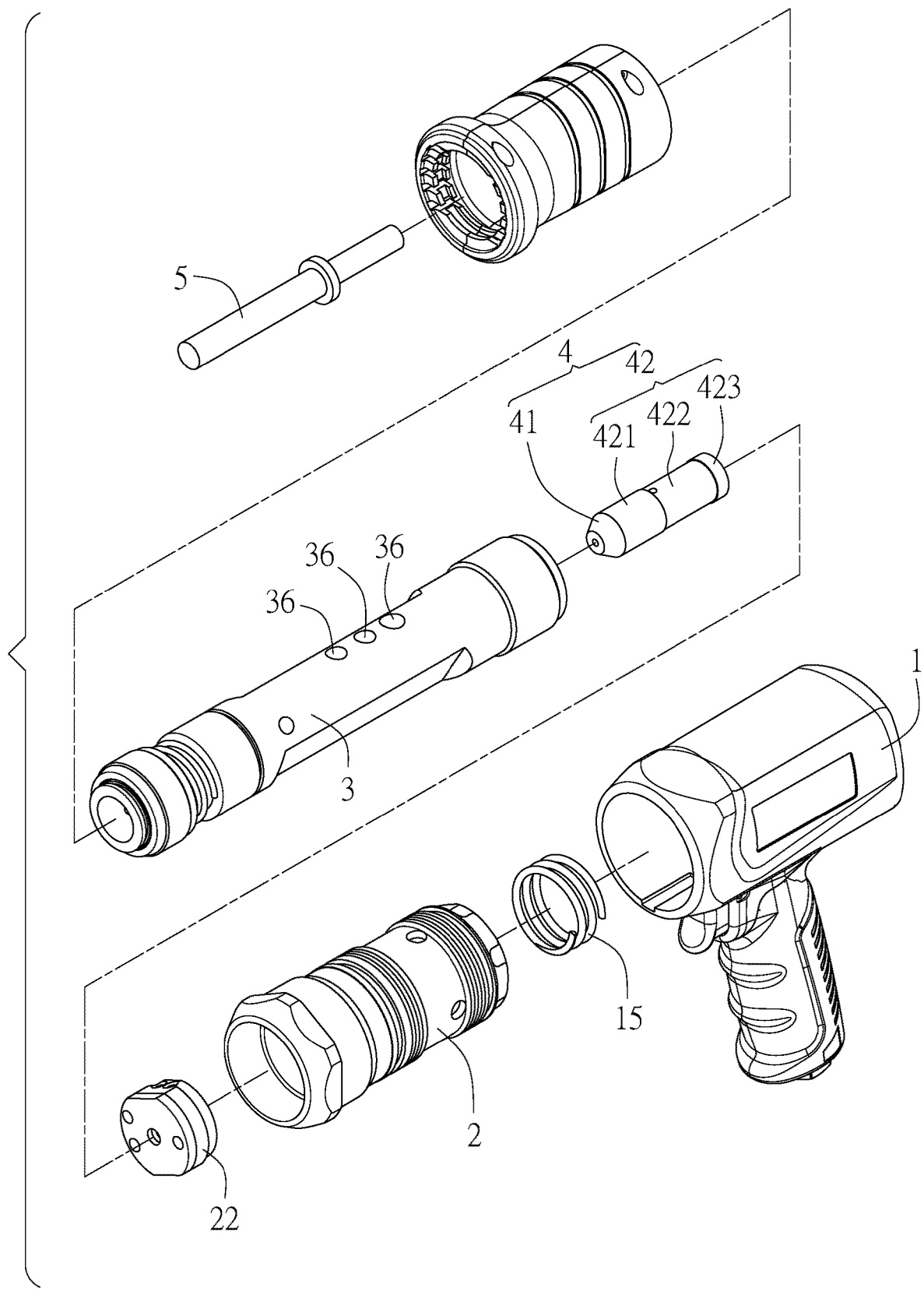
FIG. 1 is an exploded view of the present invention.
Figure 2:
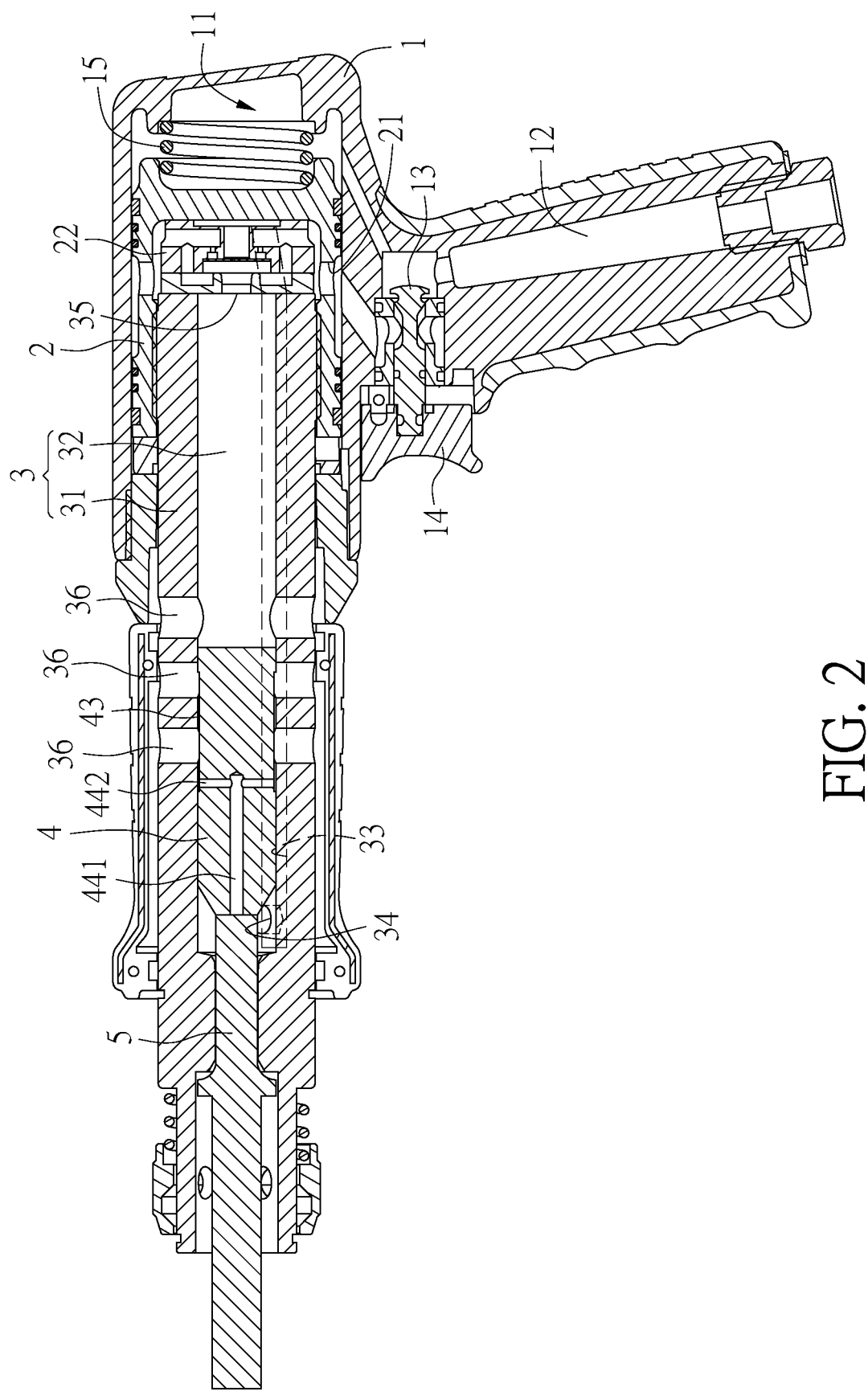
FIG. 2 is a cross-sectional view of the present invention.

Referring to FIG. 1 and FIG. 2, an air impact tool having an improved vibration-damping structure provided by the present invention comprises a grip 1, a barrel 2, an inner tubular member 3, and a hammer 4. The grip 1 may be in the shape of a pistol or a straight cylinder. In this embodiment, the grip 1 is in the shape of a pistol. The top of the grip 1 has an accommodating chamber 11. The bottom of the grip 1 has an air passageway 12 extending upward and communicating with the accommodating chamber 11 for connecting an external compressed air supply source. An air flow switch 13 is disposed in the air passageway 12 for controlling the flow of compressed air. One side of the grip 1 is provided with a trigger 14 connected with the air flow switch 13 for operation.

In this embodiment, the barrel 2 is accommodated in the accommodating chamber 11, and a spring 15 is disposed at the bottom of the accommodating chamber 11 for buffering the barrel 2. The side wall of the barrel 2 has a through hole 21 communicating with the air passageway 12. A conventional air flow control valve 22 is disposed in the barrel 2. After the compressed air is introduced into the air passageway 12, it will enter the air flow control valve 22 via the through hole 21. The air flow control valve 22 is configured to output the compressed air in two different paths.

The inner tubular member 3 is a circular tubular structure having an annular wall 31 and a cavity 32 surrounded by the annular wall 31. The annular wall 31 extends into the barrel 2, and is fastened to the barrel 2 with threads. The inner tubular member 3 extends out of the barrel 2. A tool head 5 is provided at the front end of the inner tubular member 3. The tool head 5 can be replaced according to the need of actual use. An air flow channel 33 communicating with the air flow control valve 22 is defined inside the annular wall 31 except the cavity 32. A first air inlet 34 is formed at the front end of the cavity 32. A second air inlet 35 is formed at the rear end of the cavity 32. The second air inlet 35 communicates with the air flow control valve 22. Thus, the air flow control valve 22 can selectively output the compressed air to the air flow channel 33 at an appropriate time, and then the compressed air is injected into the cavity 32 via the first air inlet 34 or the second air inlet 35.

Furthermore, the annular wall 31 has at least one exhaust hole 36 for the cavity 32 to communicate with the outside of the air impact tool. In this embodiment, the annular wall 31 has three exhaust holes 36 arranged in a straight line along the axial direction of the inner tubular member 3. The respective distances between the exhaust holes 36 and the tool head 5 are different. Furthermore, the three exhaust holes 36 are disposed between the first air inlet 34 and the second air inlet 35.

Figure 3:
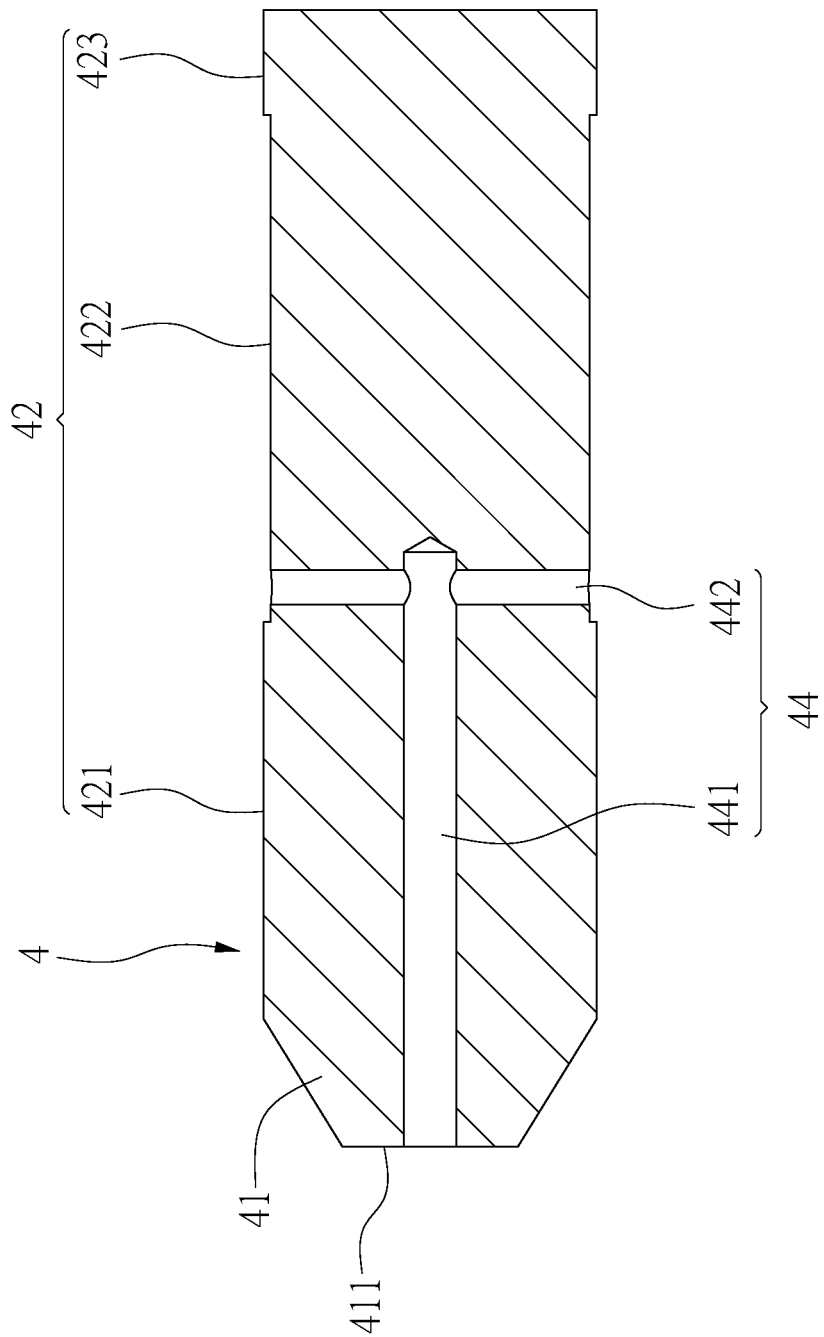
FIG. 3 is a cross-sectional view of the hammer of the present invention.

As shown in FIG. 2 and FIG. 3, the hammer 4 is disposed in the cavity 32. The hammer 4 includes a head portion 41 and a body portion 42 integrally connected to the head portion 41. The head portion 41 is closer to the first air inlet 34 than the body portion 42. In this embodiment, the head portion 41 is in the shape of a truncated cone and has a flat end face 411. The body portion 42 is in the shape of a cylinder. The body portion 42 includes a front section 421, a middle section 422, and a rear section 423. The outer diameter of the front section 421 and the rear section 423 is equal to the inner diameter of the cavity 32. The front section 421 and the rear section 423 are in close contact with the annular wall 31. The outer diameter of the middle section 422 is slightly less than the outer diameter of the front section 421 and the rear section 423, and is also slightly less than the inner diameter of the cavity 32, so that a cylindrical gap 43 is formed between the middle section 422 and the annular wall 31.

An exhaust passageway 44 is defined inside the hammer 4. The exhaust passageway 44 communicates with the cavity 32 and the cylindrical gap 43. In this embodiment, the exhaust passageway 44 includes an axial section 441 and a radial section 442. The axial section 441 is formed by drilling in the axial direction from the center of the end face 411 of the head portion 41. The axial section 441 is formed by drilling in the radial direction from the middle section 422. The axial section 441 and the radial section 442 intersect to form a T shape and communicate with each other.

Figure 4:
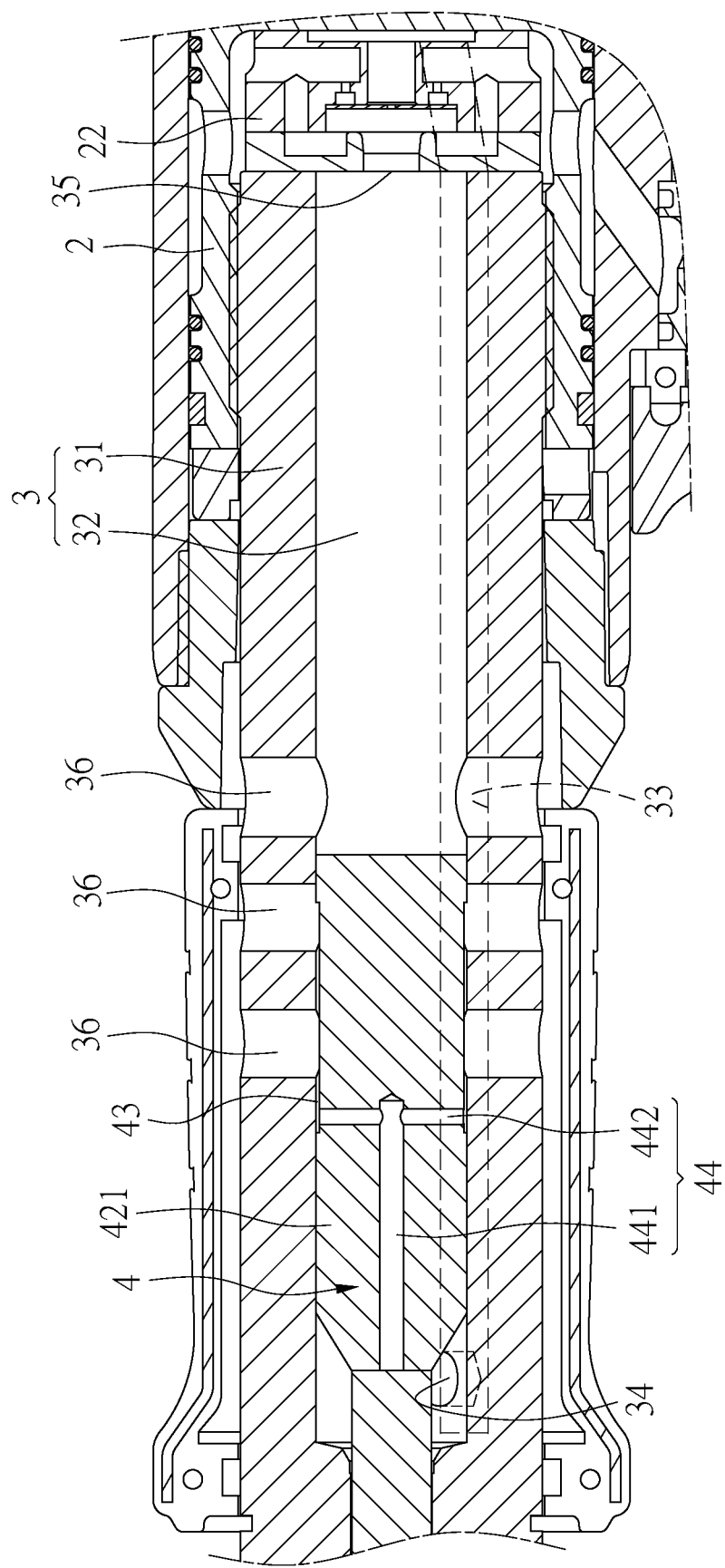
FIGS. 4 to 6 are schematic views showing the operation of the present invention.

In this embodiment, the relative positional relationship between the cylindrical gap 43 and the exhaust holes 36 is as shown in FIG. 4. In detail, when the hammer 4 is moved to the front end of the cavity 32 and is in contact with the tool head 5, the cylindrical gap 43 communicates with the two exhaust holes 36 closest to the tool head 5, and the junction of the radial section 442 of the exhaust passageway 44 and the cylindrical gap 43 is located near the front section 421.

With the above structure, when the trigger 14 is pressed to control the air flow switch 13, the compressed air is introduced into the air flow control valve 22 via the air passageway 12. The air flow control valve 22 first injects the compressed air into the cavity 32 from the second air inlet 35. At this time, the compressed air pushes the hammer 4 to move forward at a high speed to hit the tool head 5, so as to produce a working effect. Next, the air flow control valve 22 changes the air supply path and stops injecting the compressed air into the cavity 32 from the second air inlet 35. The compressed air is introduced into the air flow channel 33, and then injected into the cavity 32 via the first air inlet 34. As for the technology of changing the air supply path by the air flow control valve 22, it is a common and conventional technology and won't be described hereinafter.

Figure 5:
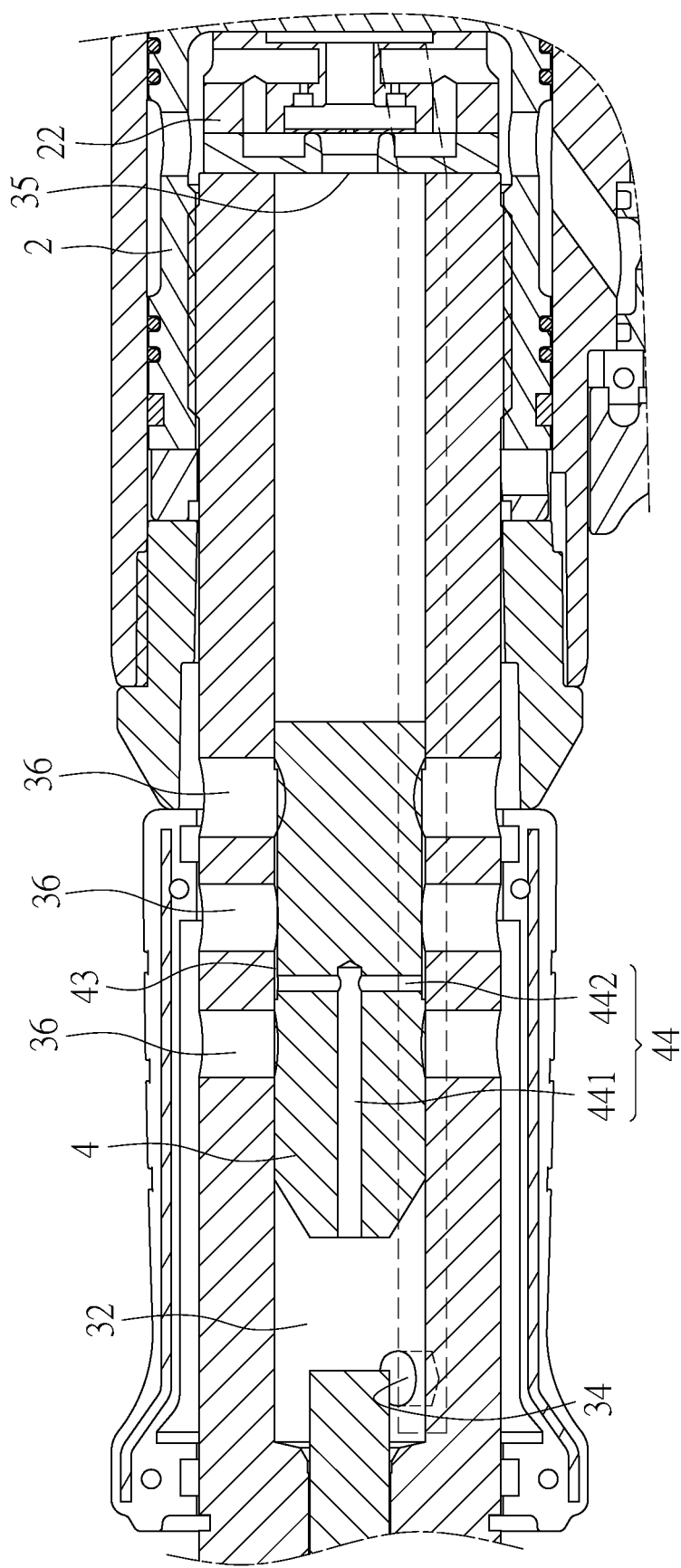
Figure 6:
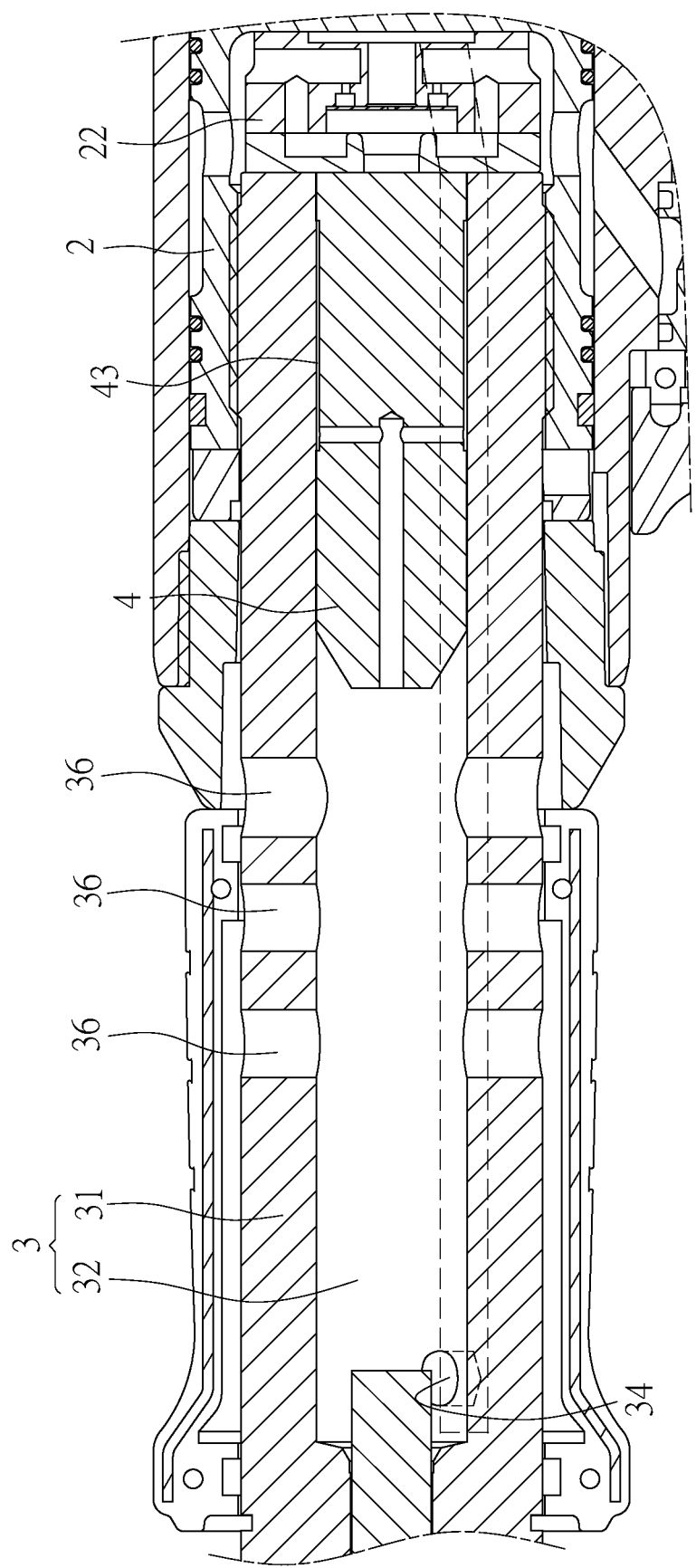

At this time, the compressed air starts to push the hammer 4 to move back. As shown in FIG. 5 and FIG. 6, when the hammer 4 leaves the tool head 5, the compressed air in the cavity 32 passes through the axial section 441 and the radial section 442 of the exhaust passageway 44 as well as the cylindrical gap 43 and the exhaust holes 36 to be exhausted to the outside of the air impact tool for reducing the pressure in the cavity 32, thereby reducing the force of the hammer 4 being pushed. Accordingly, when the hammer 4 is moved to the rearmost end of the cavity 32, the amplitude of the vibration will be reduced.

In the vibration-damping process of the present invention, when the hammer 4 is located at the front end of the cavity 32 as shown in FIG. 4, the cylindrical gap 43 communicates with the exhaust holes 36. At this time, the compressed air is to be exhausted. Compared with the prior art, the time to exhaust the compressed air in the present invention is earlier, so the force to push the hammer 4 can be reduced. In the process of moving the hammer 4 back, as shown in FIG. 5, the compressed air is continuously exhausted via the cylindrical gap 43 to communicate with the different exhaust holes 36. Further, the force to push the hammer 4 back is continuously reduced, and the vibrations are greatly reduced.

The feature of the present invention is that at the source of the vibrations of the pneumatic tool (that is, the impact force of the hammer 4 to be moved back), the impact force of the hammer 4 to be moved back is directly reduced by exhausting the compressed air. The present invention can provide a better vibration-damping effect than the prior art, and it does not affect the force of the compressed air driving the hammer forward to hit the tool head. Therefore, the present invention can provide a vibration-damping effect on the premise of taking into account the output power of the air impact tool.

What is claimed is:
1. An air impact tool having an improved vibration-damping structure, comprising:

a grip, having an accommodating chamber therein and an air passageway communicating with the accommodating chamber, an air flow switch being disposed in the air passageway;

a barrel, accommodated in the accommodating chamber, an air flow control valve being disposed in the barrel, a side wall of the barrel having a through hole communicating with the air passageway for introducing compressed air into the air flow control valve;

an inner tubular member, including an annular wall secured to the barrel and a cavity surrounded by the annular wall, a tool head being disposed at a front end of the annular wall, the annular wall having at least one exhaust hole for the cavity to communicate with an outside of the air impact tool, an air flow channel communicating with the air flow control valve and the cavity being defined inside the annular wall, the air flow channel being formed with a first air inlet at a front end of the cavity, a second air inlet being formed at a rear end of the cavity, the second air inlet communicating with the air flow control valve, the air flow control valve selectively injecting the compressed air into the cavity from the first air inlet or the second air inlet;

a hammer, disposed in the cavity, the hammer including a head portion and a body portion, the head portion being closer to the first air inlet than the body portion, the body portion including a front section, a middle section and a rear section, the front section and the rear section being in close contact with the annular wall, a cylindrical gap being defined between the middle section and the annular wall, the head portion having an exhaust passageway communicating with the cavity and the cylindrical gap;

wherein when the air flow control valve injects the compressed air into the cavity from the second air inlet, the hammer is pushed by the compressed air to move toward the tool head;

wherein when the air flow control valve injects the compressed air into the cavity from the first air inlet, the hammer is pushed away from the tool head by the compressed air; when the cylindrical gap communicates with the exhaust hole, the compressed air in the cavity is exhausted via the exhaust passageway, the cylindrical gap and the exhaust hole in sequence, so as to reduce a force with which the hammer is pushed.

2. The air impact tool as claimed in claim 1, wherein when the hammer is in contact with the tool head, the cylindrical gap communicates with the exhaust hole.

3. The air impact tool as claimed in claim 1, wherein the at least one exhaust hole includes three exhaust holes, and respective distances between the exhaust holes and the tool head are different.

4. The air impact tool as claimed in claim 3, wherein when the hammer is in contact with the tool head, the cylindrical gap communicates with the two exhaust holes closest to the tool head.

5. The air impact tool as claimed in claim 1, wherein the exhaust passageway includes an axial section and a radial section that intersect to form a T shape.

6. The air impact tool as claimed in claim 5, wherein the axial section is located in a center of the head portion of the hammer.

* * * * *